(12) United States Patent
Suzuki

(10) Patent No.: US 8,029,147 B2
(45) Date of Patent: Oct. 4, 2011

(54) PROJECTION OPTICAL SYSTEM AND PROJECTION DISPLAY DEVICE USING THE SAME

(75) Inventor: Takashi Suzuki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 10 days.

(21) Appl. No.: 12/467,411

(22) Filed: May 18, 2009

(65) Prior Publication Data

US 2010/0128345 A1 May 27, 2010

Related U.S. Application Data

(63) Continuation of application No. 11/357,049, filed on Feb. 21, 2006, now Pat. No. 7,549,755.

(30) Foreign Application Priority Data

Feb. 28, 2005 (JP) ................................. 2005-053782

(51) Int. Cl.
*G03B 21/22* (2006.01)
(52) U.S. Cl. .......................................... 353/99; 353/98
(58) Field of Classification Search ................... 353/77, 353/78, 98, 99; 348/744, 759, 760, 761, 348/762, 763, 764, 765, 767, 768, 769, 770, 348/771, 772, 773, 774, 775
See application file for complete search history.

(56) References Cited

U.S. PATENT DOCUMENTS

| | | | |
|---|---|---|---|
| 4,983,026 A | 1/1991 | Kudo et al. | |
| 5,086,355 A | 2/1992 | Kudo et al. | |
| 5,477,394 A | 12/1995 | Shibazaki | |
| 5,716,118 A | 2/1998 | Sato et al. | |
| 6,771,427 B1 | 8/2004 | Matsuo | |
| 7,048,388 B2 | 5/2006 | Takaura et al. | |
| 7,441,908 B2 | 10/2008 | Takaura et al. | |
| 2004/0156117 A1* | 8/2004 | Takaura et al. | 359/651 |

FOREIGN PATENT DOCUMENTS

JP        63-165813 A        7/1988

(Continued)

OTHER PUBLICATIONS

Notification of Reasons for Refusal issued Nov. 24, 2010 for Japanese Application No. 2005-053782.

*Primary Examiner* — Georgia Y Epps
*Assistant Examiner* — Bao-Luan Le
(74) *Attorney, Agent, or Firm* — Birch, Stewart, Kolasch & Birch, LLP

(57) ABSTRACT

A projection optical system having a magnification side and a reduction side for forming a magnified image on a magnification side image surface conjugate with a reduction side conjugate image surface includes, arranged in order from the reduction side, a first imaging system including a plurality of lens elements and lens components and a second imaging system including a mirror having a concave, aspheric reflecting surface. An intermediate image is formed between the first imaging system and the second imaging system. The projection optical system satisfies specified conditions related to the travel of principal rays through the projection optical system and related to the Abbe number of a lens element having positive refractive power of the first imaging system. A projection display device includes the projection optical system and may include a light valve for modulating a light beam for projection on a screen.

14 Claims, 8 Drawing Sheets

FOREIGN PATENT DOCUMENTS

| | | |
|---|---|---|
| JP | 7-1315 A | 1/1995 |
| JP | 9-179064 A | 7/1997 |
| JP | 2002-148514 A | 5/2002 |
| JP | 2002-174853 A | 6/2002 |
| JP | 2004-258620 A | 9/2004 |
| JP | 2007-79524 A | 3/2007 |
| WO | 01/06295 A1 | 1/2001 |
| WO | WO 2006/043666 A1 | 4/2006 |

\* cited by examiner

PROJECTION OPTICAL SYSTEM AND PROJECTION DISPLAY DEVICE USING THE SAME

This application claims the benefit of priority under 35 U.S.C. 120 of allowed U.S. application Ser. No. 11/357,049 that was filed on Feb. 21, 2006, which application claimed the benefit under 35 U.S.C. 119 of JP Application 2005-053782 that was filed on Feb. 28, 2005.

TECHNICAL FIELD OF THE INVENTION

The present invention relates to a projection optical system and a projection display device, particularly a projection optical system for rear projection.

BACKGROUND OF THE INVENTION

Projection optical systems using a refractive optical system with refractive optical elements made of optical glass for projection display devices and projection televisions have been widely known.

However, when refractive optical systems are used as the projection optical systems, chromatic aberrations occur because of the characteristics of optical glass varying with wavelength. Particularly, the axial chromatic aberration in long focal length optical systems, known as telescope-type optical systems, and the lateral color aberration in short focus optical systems is a major problem.

An optical system formed as a single mirror has been proposed to eliminate such chromatic aberrations. Also, optical systems with a small number of minors, more specifically—three minors having curved aspheric surfaces, have been proposed in Japanese Laid-Open Patent Applications H10-111458, 2001-222063, 2001-235681, 2003-344772, and Japanese Patent No. 3043583. However, because at least three aspheric minors are used in the projection optical systems described in the above-mentioned Japanese laid-open patent applications and Japanese patent, high accuracy of assembly is required and manufacturing costs become high.

Recently, demand for compactness of such projection optical systems has become strong, and a projection optical system with oblique projection favorable to making such devices compact, as shown in Japanese Laid-Open Patent Application 2004-226997, has attracted attention.

Such a projection optical system with oblique projection easily results in deterioration of imaging performance even if only a small deviation from design values occurs, particularly, a big trapezoidal distortion easily occurs due to tilting of the optical elements. Therefore, methods of using plural aspheric minors have been proposed to compensate for these drawbacks.

As described above, when plural aspheric mirrors are used in the projection optical systems with oblique projection, high accuracy of assembly is required and manufacturing costs become high.

Accordingly, the development of a projection optical system capable of relaxing the requirements of accuracy of assembly of the optical system while maintaining good optical performance is an urgent necessity for satisfying the requirements for a compact device.

BRIEF SUMMARY OF THE INVENTION

The present invention relates to a high-performance, compact projection optical system and projection display device in which the assembly of the optical system is easy, manufacturing costs can be lowered, and the projected image is subject to little distortion.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

Figure 1:
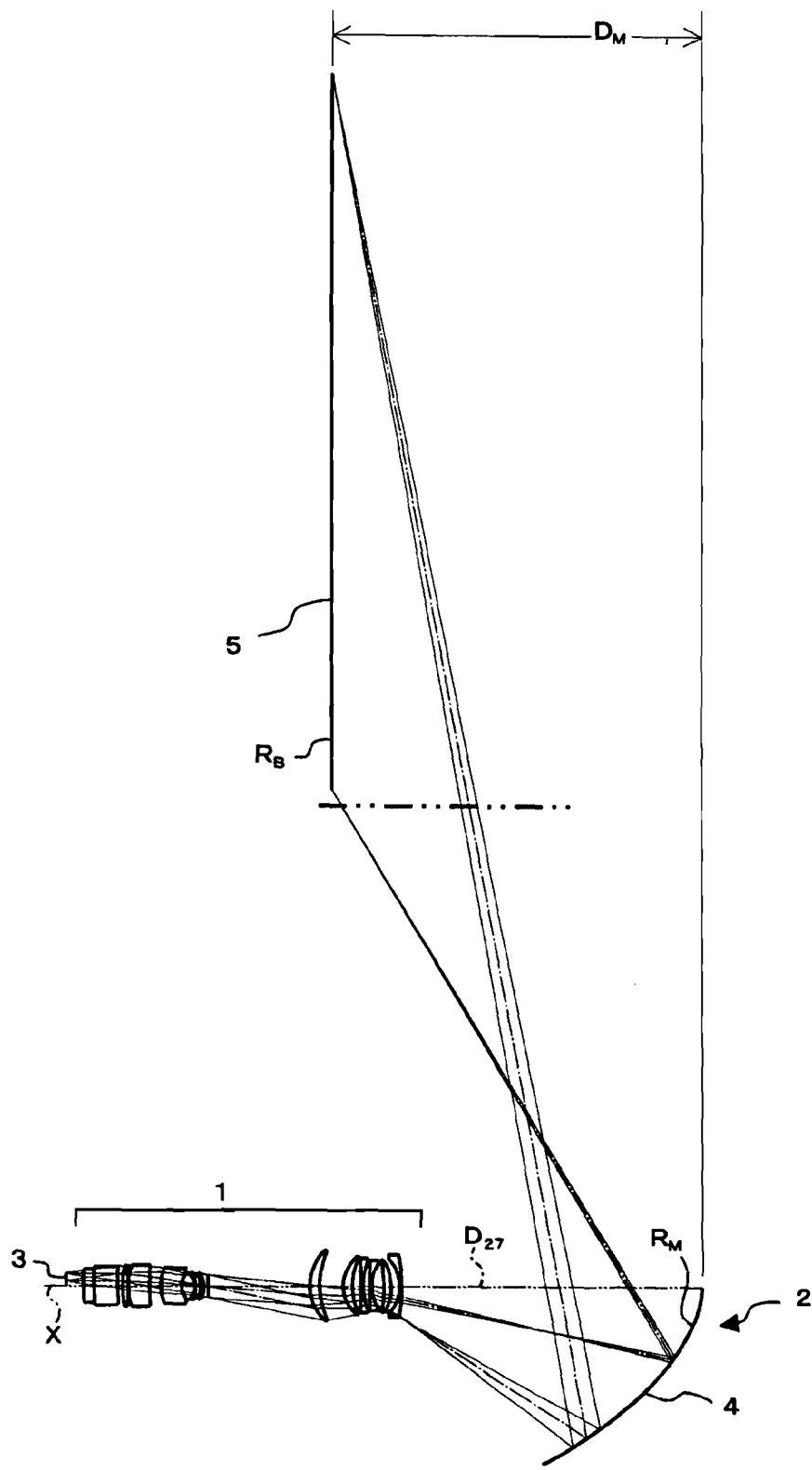
FIG. 1 shows a cross-sectional view of the projection optical system according to Embodiment 1 of the present invention.
Figure 2:
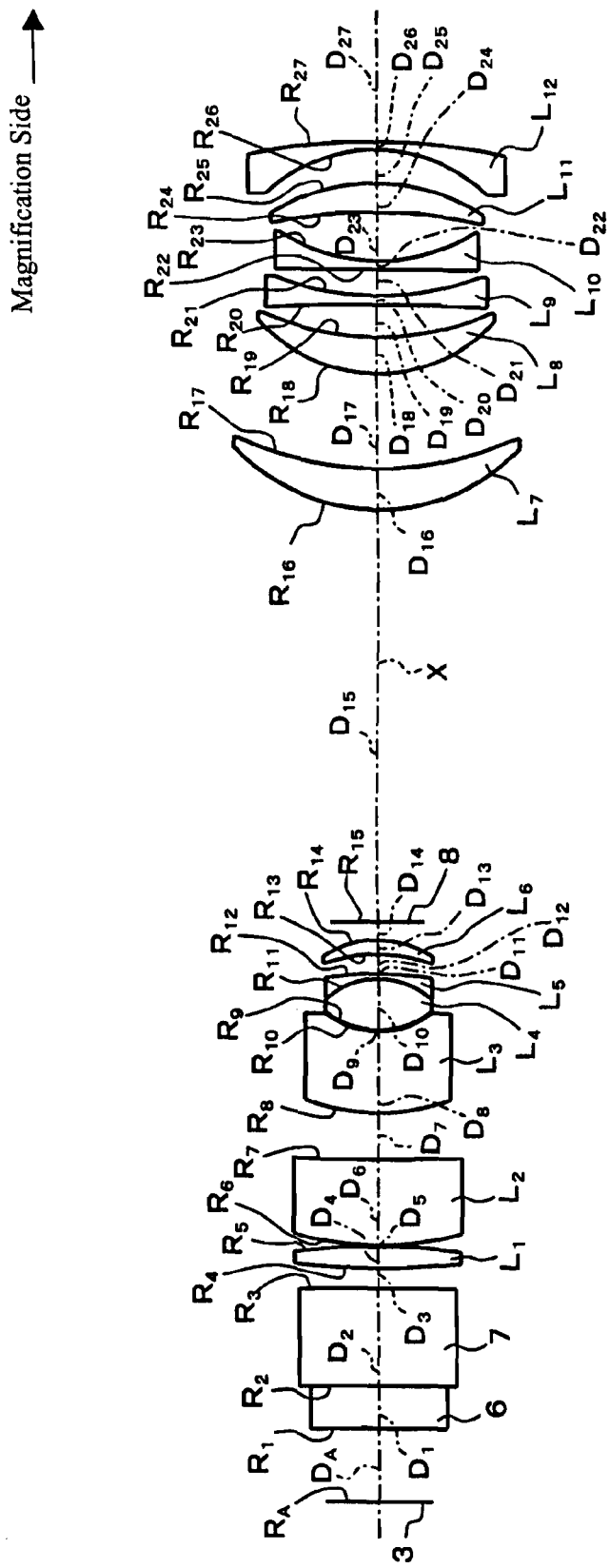
FIG. 2 shows details of the cross-sectional view of the projection optical system of FIG. 1.

A general description of the projection optical system of the present invention that pertains to disclosed embodiments of the invention will now be described with reference to FIGS. 1 and 2 that show Embodiment 1. This projection optical system is used as a projection optical system for a projection display device. FIG. 1 shows the entire optical system from the reduction side image surface at a light valve 3 on the optical axis X of a first imaging system 1 to the magnification side image surface at a screen onto which an intermediate image is relayed by a second imaging system 2. FIG. 2 shows an enlarged detailed view of the first imaging system of FIG. 1 with the direction toward the screen indicated by a horizontal arrow at the upper right of the figure.

In FIG. 2, lens elements are referenced by the letter L with a subscript number denoting their order from the reduction side of the projection optical system along the optical axis X, from $L_1$ to $L_{12}$. Similarly, the radii of curvature of the optical surfaces are referenced by the letter R with a subscript number denoting their order from the reduction side of the projection optical system, from $R_1$ to $R_{27}$. The on-axis surface spacings along the optical axis X of the various optical surfaces are referenced by the letter D with a subscript number denoting their order from the reduction side of the projection optical system, from $D_1$ to $D_{27}$. Additionally, as shown in FIG. 1, the second imaging system 2 includes a minor 4 with the radius of curvature thereof referenced by $R_M$, and the radius of curvature of the screen 5, which is planar, is referenced by $R_B$. Furthermore, the maximum horizontal distance between the mirror 4 and the screen 5 is referenced by $D_M$, with a double-headed horizontal arrow indicating the extent of $D_M$. The on-axis surface spacings D are measured along the optical axis between points where each vertex of an optical element intersects the optical axis or are measured in a direction parallel to the optical axis between points common to a line perpendicular to the optical axis and passing through such a vertex or a conjugate image plane or surface. By having the vertex of the minor 4 on the optical axis X, as shown in FIG. 1, the distance $D_M$ between the mirror 4 and the screen 5, which is measured in the direction of the optical axis X, is minimized.

In this projection display device, a light beam from a light source (not shown) is irradiated on the light valve 3 via an illumination optical section (not shown), and a light beam carrying image information introduced by the light valve 3 modulating the light beam is magnified and projected on a screen 5 by a projection optical system made up of the projection lens system 1, which is the first imaging system, and a minor 4, which is the second imaging system 2. The screen 5 is arranged at least approximately at the magnification side image surface or plane of the projection optical system and the light valve 3 is arranged at least approximately at the reduction side image surface or plane of the projection optical system that is conjugate with the magnification side image surface or plane. As shown in FIG. 2, a cover glass 6, which is a plane parallel plate, and a prism 7, such as a color synthesis prism, a light deflecting prism, or similar device, are arranged on the light emergence side of the light valve 3. An intermediate image is formed between the first imaging system 1 and the second imaging system 2.

Figure 3:
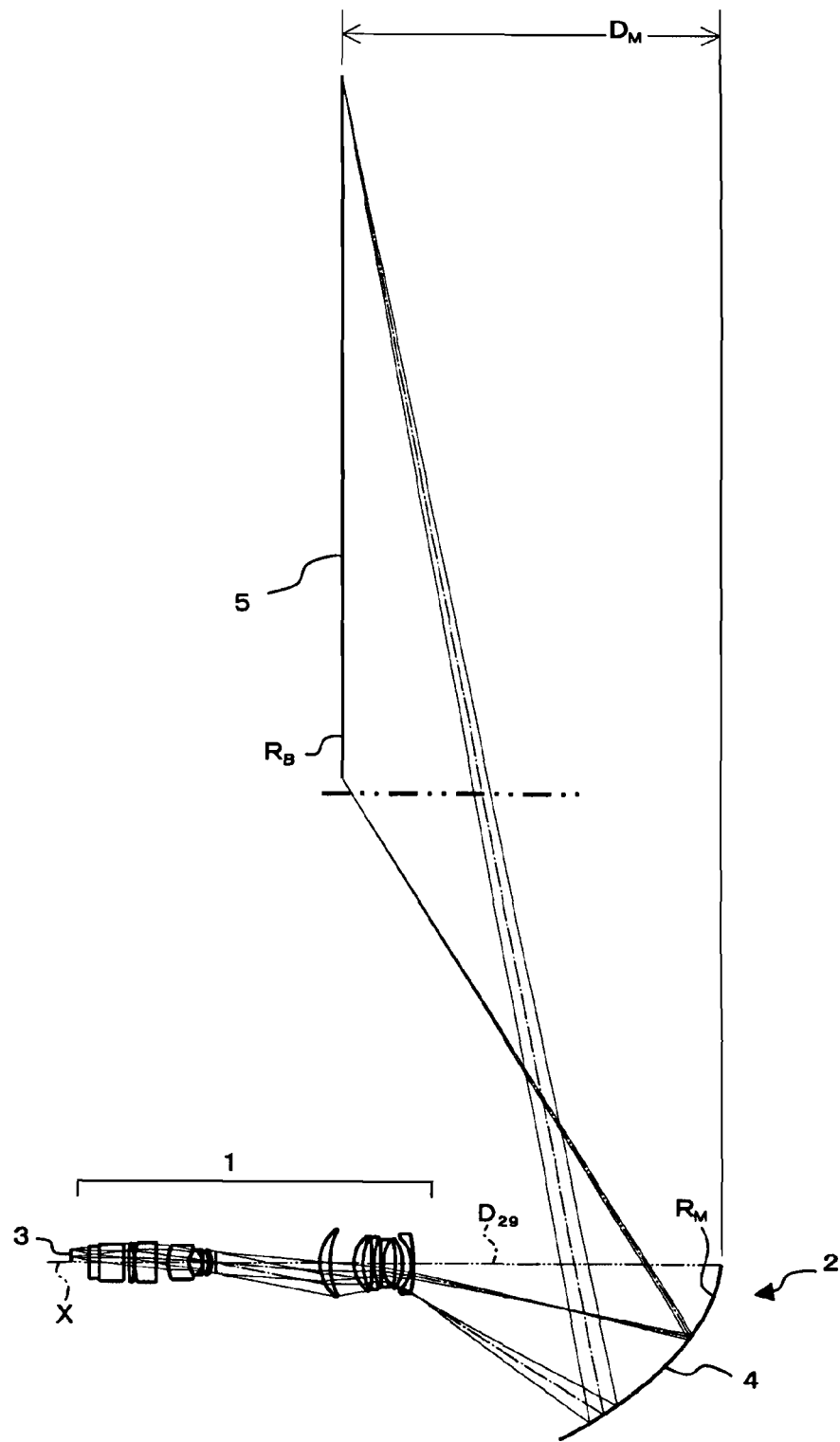
FIG. 3 shows a cross-sectional view of the projection optical system according to Embodiment 2 of the present invention.

Moreover, the second imaging system 2 of the invention is used as an off-axis optical system, wherein a space on one side of the optical axis X (i.e., a lower space, as shown in FIG. 1) is used as a light reflection region. Thus, the screen 5 can be arranged in the position shown in FIG. 1, which enables making a projection display device thinner and more compact. This off-axis arrangement is accomplished by locating the reduction-side image surface on one side of the optical axis of the first optical system, thereby causing the magnification side image surface to be located across the optical axis from the reduction side image surface. For example, as shown in FIGS. 1 and 3, the magnification side image surface is positioned above the optical axis of the first optical system and thus the magnification side image surface is located below the optical axis of the first optical system, thereby achieving what is termed herein as an "off-axis optical system" arrangement with regard to the second imaging system 2.

The second imaging system 2 is at least approximately symmetrical on both sides of the plane of FIG. 1 that includes the optical axis X, and the assembly of the optical elements is made simple by this arrangement.

It is preferable that the second imaging system 2 of the present invention satisfy the following Conditions (1) and (2):

$$0.55 < |\tan \theta 1| < 0.84 \qquad \text{Condition (1)}$$

$$0.75 < |\tan \theta 2| < 1.3 \qquad \text{Condition (2)}$$

where
- $\theta 1$ is the maximum angle among all the angles that principal rays from the first imaging system to the second imaging system make with the normal to the reduction side conjugate image surface, and
- $\theta 2$ is the angle difference between the incident angle and emergent angle in the second imaging system of the principal ray having the maximum angle among all the angles that principal rays from the first imaging system to the second imaging system make with the normal to the reduction side conjugate image surface.

Additionally, it is preferable that the first imaging system 1 and the second imaging system 2 have a common optical axis, each have a rotationally symmetric shape, and that the following Condition (3) be satisfied:

$$1.7 < |(L \cdot \tan \theta 1)/Y| < 2.8 \qquad \text{Condition (3)}$$

where
- $\theta 1$ is the maximum angle among all the angles that principal rays from the first imaging system to the second imaging system make with the normal to the reduction side conjugate image surface;
- L is the distance along said optical axis from the reduction side conjugate image surface to the closest lens element of the first imaging system; and
- Y is the distance from the intersection of the optical axis and the reduction side conjugate image surface to the image point of the reduction side conjugate image surface that is farthest from the intersection.

Also, it is preferable that the first imaging system includes at least one lens element having positive refractive power, and the material of the at least one lens element satisfies the following Condition (4):

$$\nu_{convex} > 80 \qquad \text{Condition (4)}$$

where
- $\nu_{convex}$ is the Abbe number of the material of the first lens element having positive refractive power of the first imaging system.

A high performance projection optical system is enabled by arranging the optical elements to satisfy Conditions (1)-(4) above.

The particular technical meaning of Conditions (1)-(4) above is described below.

Satisfying Condition (1) enables determining a good balance of providing wide-angle projection and ease of correction of aberrations. If the lower limit of Condition (1) is not satisfied, changes in the incident position and the angle of incidence at the field angle of the light incident upon the second imaging system decrease, and it becomes difficult to construct the second imaging system for widening an image to a wide angle and forming it on the screen 5 at the same time. On the other hand, if the upper limit of Condition (1) is not satisfied, the first imaging system has too wide an angle and aberration correction of the first imaging system becomes difficult.

Condition (2) prescribes a balance between compaction of the entire device and ease of observation of an image on the screen 5. If the lower limit of Condition (2) is not satisfied, the angle of incidence of a light beam incident on the screen 5 decreases, becoming closer to perpendicular incidence, and the distance between the screen 5 and the second imaging system increases, making it difficult to make the device compact. On the other hand, if the upper limit of Condition (2) is not satisfied, the optical path of a beam incident upon the screen 5 is nearly parallel to the surface of the screen 5, making it difficult to observe an image on the screen 5.

Condition (3) defines a range for the case of irradiating a light from the first imaging system to the image display surface when the light valve 3 is a reflective light valve.

Namely, with a reflective light valve 3, such as a reflective liquid crystal (LCOS) or a DMD, the angle of incidence of a light beam incident upon the image display surface of the light valve 3 must be small, that is, close to perpendicular incidence, but the use of a reflective light valve requires that a space for inserting an oblique reflecting plane be provided between the first imaging system and the image display surface of the reflective light valve. If the lower limit of Condition (3) is not satisfied, it becomes difficult to include a large enough space. On the other hand, if the upper limit of Condition (3) is not satisfied, the operating distance of the first imaging system increases too much and the aberration correction becomes difficult.

Condition (4) prescribes a range of the Abbe number of a lens element having positive refractive power in the first imaging system in order to favorably correct chromatic aberrations. Namely, if Condition (4) is not satisfied, it becomes difficult to favorably correct both axial chromatic aberration and lateral color.

In the projection optical system of the present invention, the second imaging system is, preferably, formed of only one minor 4. When this second imaging system is formed of plural minors, (as in Embodiment 2, best shown in FIGS. 5A and 5B) alignment adjustment is difficult, and it is difficult to maintain high performance because of errors in assembly. In contrast, when the second imaging system is formed of only one minor, as in Embodiment 1 shown in FIG. 1, errors in assembly are small and high performance can be maintained easily.

Additionally, the minor 4 is formed as a rotationally symmetric surface about the optical axis so as to facilitate alignment adjustment. Furthermore, the first imaging system and the second imaging system have a common optical axis in order to facilitate alignment adjustment.

It is preferable that a plane mirror be arranged in a position between the second imaging system and the screen 5 (a position shown by a bold dash-double dot straight line in FIG. 1) so that compactness of the device can be achieved by folding the optical path (in the up and down direction in the plane of the paper surface of FIG. 1).

In the projection optical system of the present invention shown in FIG. 1, no reflecting optical element exists between the first imaging system and the second imaging system. As described above, in the projection optical system of the present invention, an intermediate image is formed between the first imaging system and the second imaging system. Therefore, if a reflecting optical element were arranged between the first imaging system and the second imaging system, images of dust particles adhering to the surface of the reflecting optical element would be projected onto the screen 5. Accordingly, a reflecting optical element, such as a mirror, is not arranged between the first imaging system and the second imaging system. This avoids the inconvenience of images of dust particles being projected onto the screen 5. However, if it is possible to construct a system able to solve the problem of dust (for example, if a system is constructed so as to cover the space between the first imaging system and the second imaging system with a dust-proof cover), a plane mirror 9, as shown in FIG. 5B, may be arranged between the first imaging system consisting of a projection lens system 1 and the second imaging system 2 consisting of a mirror 4 in order to fold the optical path and achieve compaction of the device.

Figure 4:
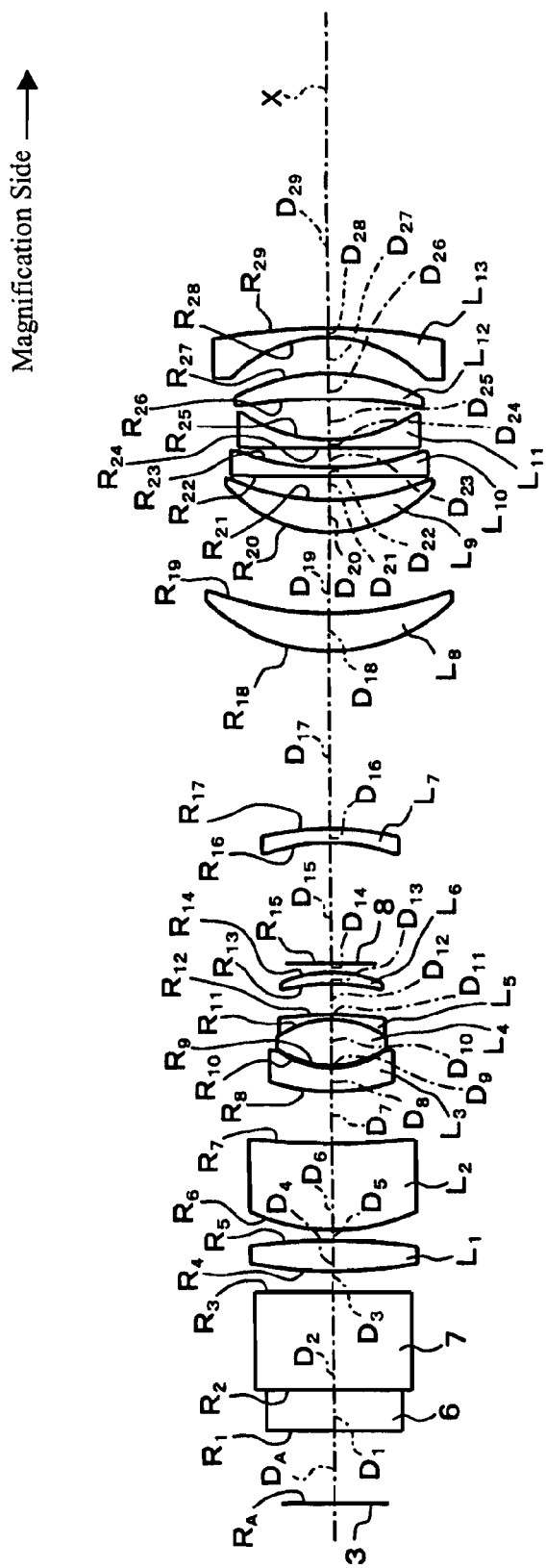
FIG. 4 shows details of the cross-sectional view of the projection optical system of FIG. 3.

Moreover, the first imaging system of Embodiment 2 of the present invention, as shown in FIG. 4, includes a lens element having negative refractive power and made of a resinous material (the seventh lens L7 in FIG. 4).

In Embodiment 2, the focus position fluctuates with changes in temperature of the first lens element L1 having positive refractive power and satisfying Condition (4) above. A lens element having negative refractive power and made of a resinous material arranged in the first imaging system can compensate for this fluctuation.

Figure 5B:
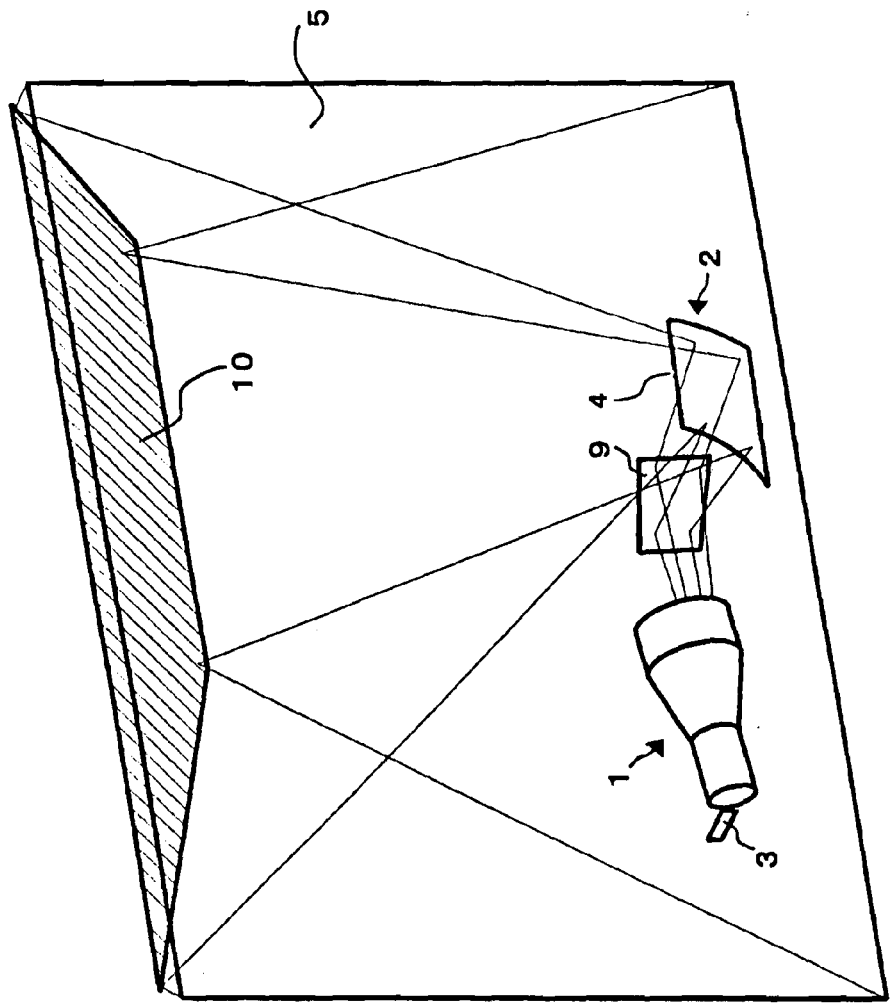
FIGS. 5A and 5B show a side view and a front view, respectively, of the projection optical system according to Embodiment 2 of the present invention.
Figure 5A:
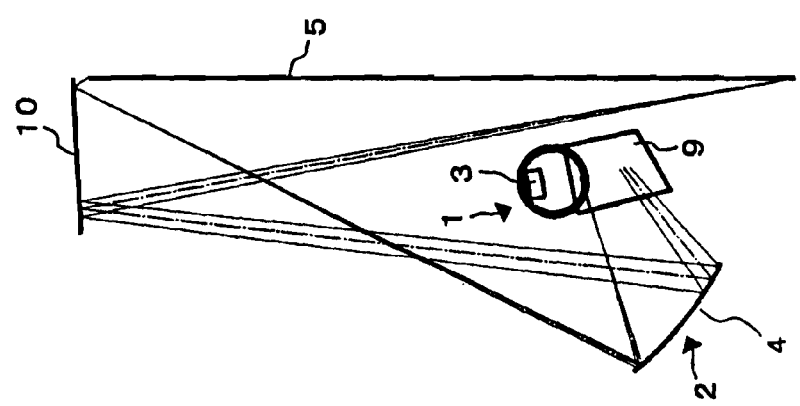

A projection display device including a projection optical system of the present invention applied to a rear projection television is shown in side view in FIG. 5A and in front view in FIG. 5B, with some differences from the projection optical system shown in FIG. 1.

As shown in FIGS. 5A-5B, the optical path from the second imaging system 2 to the screen 5 is folded by a plane minor 10 in order to make the entire device compact. In addition, a plane mirror 9 is arranged between the projection lens system 1 and the second imaging system 2 to fold the optical path to a compact arrangement. As shown in FIG. 5A, the entire second imaging system 2 is behind the screen 5, thus achieving an effective use of space.

Two embodiments of the present invention will now be individually described with reference to the drawings.

As in the embodiment shown in FIG. 1, a reflected light beam from the mirror 4 enters at an extremely large angle of incidence to the screen 5.

The projection optical system and the projection display device of the present invention are constructed having a magnification side and a reduction side for forming a magnified image on the magnification side at an image surface that is conjugate with a surface on the reduction side. The projection optical system includes, in order from the reduction side: a first imaging system including a plurality of lens elements and lens components and a second imaging system including a mirror (or minors) having a concave aspheric reflecting surface, and an intermediate image is formed between the first imaging system and the second imaging system. Accordingly, a real image with less distortion can be formed on a screen using a small number of mirrors even though a large angle of incidence is used in an oblique incidence optical system, and the occurrence of chromatic aberrations can be suppressed as compared to a case of forming the projection optical system using only one mirror and one imaging system. Because the second imaging system may use only one minor, the assembly of the optical system can be facilitated and the device can be made compact.

Moreover, by the projection optical system and the projection display device of the present invention being constructed with an intermediate image formed between the first imaging system and the second imaging system, the second imaging system can be constructed with a smaller mirror as compared to a system that is constructed with a convex minor in the second imaging system and without an intermediate image between the first imaging system and the second imaging system.

Specifically, when the minors constructing the second imaging system are made in the shape of a convex surface or a flat surface, the crossing position of a light ray equivalent to a wide field angle among light rays emergent from the first imaging system at the minor surface is at a large distance from the optical axis, which requires that this minor become large (see, for example, FIG. 3 of Japanese Laid-Open Patent Application 2003-344772). In contrast, with the projection optical system of the present invention, if an image is formed between the first imaging system and the second imaging system, the crossing position of a light ray equivalent to a wide field angle among light rays emergent from the first imaging system at the minor surface is at a position approaching the optical axis, thus allowing miniaturization of this minor.

Two embodiments, Embodiments 1 and 2, of the present invention will now be individually described with reference to the drawings.

In the projection optical system of both Embodiments 1 and 2 of the present invention, the minor 4 of the second imaging system is concave and is formed as an aspheric surface defined by the following equation:

$$Z = \Sigma(A_i \cdot Y^i) \qquad \text{Equation (A)}$$

where
Z is the length (in mm) of a line drawn from a point on the aspheric minor surface at a distance Y from the optical axis to the tangential plane of the aspheric surface vertex, and
$A_i$ is the ith aspheric coefficient, and the summation extends over i.

In Embodiments 1 and 2 of the present invention disclosed below, only aspheric coefficients $A_1$-$A_{20}$ of the mirror 4 are non-zero.

Embodiment 1

FIG. 1 shows a cross-sectional view of the projection optical system according to Embodiment 1 of the present invention. FIG. 2 shows an enlarged detailed view of the first imaging system of FIG. 1.

As shown in FIG. 2, the projection lens system, which is the first imaging system, transmits a light beam carrying image information provided by a light valve 3 formed as a reflective liquid crystal on silicon (LCOS) element. As shown in FIG. 1, the projection lens system 1 is on the reduction side of a mirror 4 which forms the second imaging system 2, and, as more clearly shown in FIG. 2, the projection lens system 1 includes, arranged in order from the reduction side, a cover glass 6, which is a plane parallel plate, a prism 7, a first group of six lens elements, $L_1$-$L_6$, a stop 8, and a second group of lens elements, $L_7$-$L_{12}$.

Here, the first lens element $L_1$ is formed of glass with an Abbe number larger than eighty.

Table 1 below lists the surface number # in order from the reduction side, the radius of curvature R (in mm) of each surface on the optical axis, the on-axis surface spacing D (in mm), as well as the refractive index $N_d$ and the Abbe number $\nu_d$ (both at the d-line of 587.6 nm) of each optical element for Embodiment 1. Note that although R is the on-axis radius of curvature, for convenience of illustration, in FIG. 2 the lead lines from the R reference symbols extend to the surfaces being referenced but do not extend to the on-axis positions. As indicated at the bottom portion of Table 1, minor surface M has a concavity defined by its aspheric characteristics according to Equation (A) above and nominally has an infinite radius of curvature, as do the reduction side conjugate image surface, conjugate surface A in Table 1 below, in the vicinity of the light valve 3 and the magnification side conjugate image surface, conjugate surface B in Table 1 below, in the vicinity of the screen 5.

TABLE 1

| # | R | D | $N_d$ | $\nu_d$ |
|---|---|---|---|---|
| Conjugate Surface A | ∞ | 20.700 | | |
| 1 | ∞ | 12.000 | 1.83500 | 43.0 |
| 2 | ∞ | 28.100 | 1.51680 | 64.2 |
| 3 | ∞ | 6.050 | | |
| 4 | 216.766 | 6.385 | 1.49700 | 81.6 |
| 5 | −174.654 | 0.200 | | |
| 6 | 85.142 | 25.000 | 1.49700 | 81.6 |
| 7 | 536.356 | 13.589 | | |
| 8 | 57.628 | 24.143 | 1.81600 | 46.6 |
| 9 | 24.390 | 0.526 | | |
| 10 | 24.733 | 15.042 | 1.49700 | 81.6 |
| 11 | −22.404 | 1.500 | 1.83481 | 42.7 |
| 12 | −94.551 | 5.616 | | |
| 13 | −45.751 | 4.169 | 1.72342 | 38.0 |
| 14 | −28.843 | 5.153 | | |
| 15 | ∞ (stop) | 120.000 | | |
| 16 | 57.270 | 11.661 | 1.69350 | 53.2 |
| 17 | 95.909 | 27.920 | | |
| 18 | 44.567 | 11.007 | 1.72916 | 54.7 |
| 19 | 77.899 | 9.893 | | |
| 20 | −504.591 | 2.500 | 1.83481 | 42.7 |
| 21 | 81.925 | 7.866 | | |
| 22 | −3516.739 | 2.499 | 1.83481 | 42.7 |
| 23 | 52.379 | 14.225 | | |
| 24 | −130.101 | 8.490 | 1.80610 | 33.3 |
| 25 | −55.918 | 10.007 | | |
| 26 | −45.259 | 2.499 | 1.48749 | 70.2 |
| 27 | −171.028 | 355.522 | | |
| Mirror Surface M * | ∞ | −436.850 ($D_M$) | | |
| Conjugate Surface B | ∞ | | | |

The * to the right of the mirror surface M in Table 1 indicates, as mentioned above, that this surface is an aspheric surface, and the aspheric surface shape of this mirror surface is expressed by Equation (A) above.

Table 2 below lists the values of the aspheric coefficients $A_1$-$A_{20}$ in Equation (A) above for the minor surface M of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| $A_1$ | $A_2$ | $A_3$ | $A_4$ | $A_5$ |
|---|---|---|---|---|
| −5.19193E−2 | −4.73855E−3 | 9.60433E−6 | 1.34793E−8 | −1.19444E−9 |

| $A_6$ | $A_7$ | $A_8$ | $A_9$ | $A_{10}$ |
|---|---|---|---|---|
| 9.69221E−12 | 4.49559E−14 | −9.23601E−16 | 4.97465E−19 | 3.32850E−20 |

| $A_{11}$ | $A_{12}$ | $A_{13}$ | $A_{14}$ | $A_{15}$ |
|---|---|---|---|---|
| 1.82114E−23 | −1.19507E−24 | 1.74339E−27 | −2.62136E−29 | 2.13615E−31 |

| $A_{16}$ | $A_{17}$ | $A_{18}$ | $A_{19}$ | $A_{20}$ |
|---|---|---|---|---|
| 2.45006E−33 | −2.94134E−35 | 1.03069E−37 | −1.14839E−40 | −2.78376E−44 |

The projection optical system of Embodiment 1 satisfies Conditions (1)-(4) above, as set forth in Table 3 below.

TABLE 3

| Condition No. | Condition | Value |
|---|---|---|
| (1) | $0.55 < |\tan \theta_1| < 0.84$ | 0.647 |
| (2) | $0.75 < |\tan \theta_2| < 1.3$ | 1.060 |
| (3) | $1.7 < |(L \cdot \tan \theta_1)/Y| < 2.8$ | 2.177 |
| (4) | $\nu_{convex} > 80$ | 81.6 |

Figure 6A:
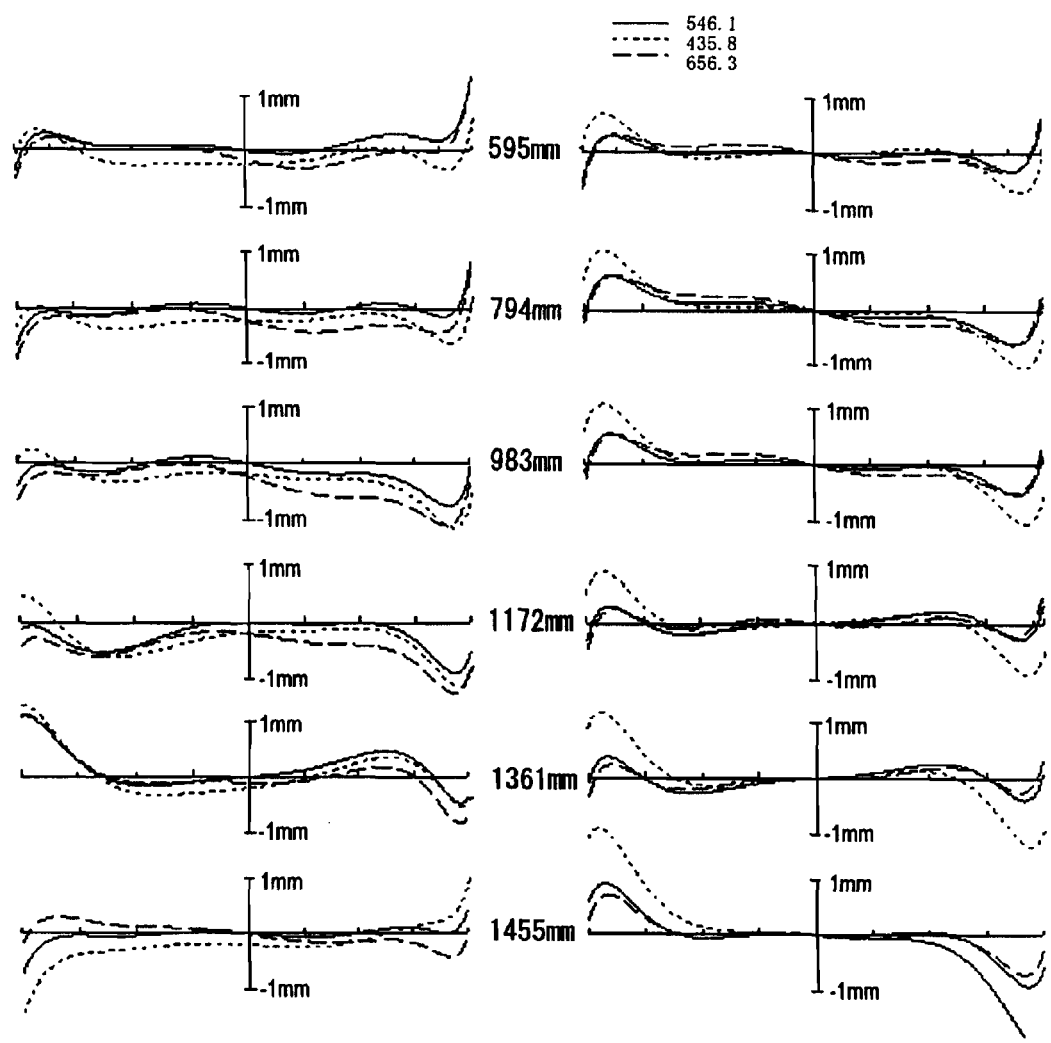
FIGS. 6A and 6B show the coma and distortion, respectively, of the projection optical system according to Embodiment 1 of the present invention.
Figure 6B:
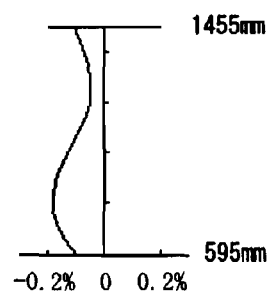

FIG. 6A shows the coma of the projection optical system of Embodiment 1 of the present invention at varying distances (595 mm to 1455 mm) from the optical axis X for light of wavelengths 435.8 nm, 546.1 nm, and 656.3 nm on the screen 5. FIG. 6A shows the coma for both the tangential (left column) and sagittal (right column) image surfaces. FIG. 6B shows the distortion (in percent) at varying distances (595 mm to 1455 mm) from the optical axis X on the screen 5.

As shown in FIGS. 6A-6B, the projection optical system of Embodiment 1 of the present invention is a high performance projection optical system that is able to favorably correct aberrations.

Embodiment 2

FIG. 3 shows a cross-sectional view of the projection optical system according to Embodiment 2 of the present invention. FIG. 4 shows an enlarged detailed view of the first imaging system of FIG. 3, and FIGS. 5A and 5B show a side view and a front view, respectively, of this embodiment. In FIGS. 3 and 4, the same symbols are attached to elements having the same effects as those of Embodiment 1 and a separate description of these elements is omitted.

The construction of this projection optical system is roughly the same as the projection optical system of Embodiment 1 but is different in ways. First, the second group of lens elements of the first imaging system 1 includes seven lens elements, $L_7$-$L_{13}$, and the seventh lens element $L_7$ has negative refractive power, is formed of a resinous material, and is the closest lens element of the second group of lens elements to the stop 8, as shown in FIG. 4. Second, the second imaging system 2 is formed of three mirrors 9, 4, and 10 rather than a single minor 4.

Table 4 below lists the surface number # in order from the reduction side, the radius of curvature R (in mm) of each surface on the optical axis, the on-axis surface spacing D (in mm), as well as the refractive index $N_d$ and the Abbe number $\nu_d$ (both at the d-line of 587.6 nm) of each optical element for Embodiment 2. As indicated at the bottom portion of Table 4, minor surface M has a concavity defined solely by its aspheric characteristics according to Equation (A) above and nominally has an infinite radius of curvature, as do the reduction side conjugate image surface, conjugate surface A in Table 4 below, in the vicinity of the light valve 3 and the magnification side conjugate image surface, conjugate surface B in Table 4 below, in the vicinity of the screen 5.

TABLE 4

| # | R | D | $N_d$ | $\nu_d$ |
|---|---|---|---|---|
| Conjugate Surface A | ∞ | 20.700 | | |
| 1 | ∞ | 12.000 | 1.83500 | 43.0 |
| 2 | ∞ | 28.100 | 1.51680 | 64.2 |
| 3 | ∞ | 6.050 | | |

TABLE 4-continued

| # | R | D | $N_d$ | $\nu_d$ |
|---|---|---|---|---|
| 4 | 135.520 | 8.933 | 1.49700 | 81.6 |
| 5 | −168.010 | 3.029 | | |
| 6 | 58.118 | 25.000 | 1.49700 | 81.6 |
| 7 | 194.513 | 15.550 | | |
| 8 | 59.937 | 6.893 | 1.81600 | 46.6 |
| 9 | 26.633 | 0.647 | | |
| 10 | 27.094 | 13.732 | 1.49700 | 81.6 |
| 11 | −26.842 | 1.500 | 1.83481 | 42.7 |
| 12 | −100.867 | 8.956 | | |
| 13 | −63.962 | 3.452 | 1.72342 | 38.0 |
| 14 | −35.844 | 2.542 | | |
| 15 | ∞ (Stop) | 35.000 | | |
| 16 | −52.553 | 4.000 | 1.49023 | 57.5 |
| 17 * | −79.601 | 52.391 | | |
| 18 | 52.802 | 10.673 | 1.69350 | 53.2 |
| 19 | 103.392 | 23.170 | | |
| 20 | 40.416 | 9.348 | 1.72916 | 54.7 |
| 21 | 72.861 | 7.032 | | |
| 22 | −6374.851 | 2.499 | 1.83481 | 42.7 |
| 23 | 77.337 | 5.777 | | |
| 24 | 6083.087 | 2.499 | 1.83481 | 42.7 |
| 25 | 44.282 | 12.519 | | |
| 26 | −149.128 | 7.482 | 1.80610 | 33.3 |
| 27 | −55.093 | 10.622 | | |
| 28 | −38.907 | 2.499 | 1.48749 | 70.2 |
| 29 | −166.069 | 354.755 | | |
| Mirror Surface M * | ∞ | −436.756 ($D_M$) | | |
| Conjugate Surface B | ∞ | | | |

The * to the right of the mirror surface M in Table 4 indicates, as mentioned above, that this surface is an aspheric surface, and the aspheric surface shape of this mirror surface is expressed by Equation (A) above.

Also, the lens surface #17 with a * to the right of the surface number in Table 4 is an aspheric lens surface, and the aspheric surface shape of this lens surface is defined by the following equation:

$$Z = [(Y^2/R)/\{1 + (1 - Y^2/R^2)^{1/2}\}] + \Sigma(A_i \cdot Y^i) \quad \text{Equation (B)}$$

where

Z is the length (in mm) of a line drawn from a point on the aspheric lens surface at a distance Y from the optical axis to the tangential plane of the aspheric surface vertex, R is the radius of curvature (in mm) of the aspheric lens surface on the optical axis, Y is the distance (in mm) from the optical axis, and $A_i$ is the ith aspheric coefficient, and the summation extends over i.

In Embodiment 2 of the present invention, only aspheric coefficients $A_3$-$A_{20}$ of lens surface #17 are non-zero.

Table 5 below lists the values of the aspheric coefficients $A_1$-$A_{20}$ in Equation (A) above for the minor surface M of Table 4. Table 5 below also lists the values of the aspheric coefficients $A_3$-$A_{20}$ in Equation (B) above for the aspheric lens surface (surface #17) of Table 4. Aspheric coefficients that are not present in Table 5 are zero. An "E" in the data indicates that the number following the "E" is the exponent to the base 10. For example, "1.0E−2" represents the number $1.0 \times 10^{-2}$.

TABLE 5

| # | $A_1$ | $A_2$ | $A_3$ | $A_4$ | $A_5$ |
|---|---|---|---|---|---|
| 17 | 0 | 0 | −3.63807E−6 | 2.57731E−7 | −7.50463E−9 |
| Mirror Surface M | −5.35756E−2 | −4.78640E−3 | 9.61032E−6 | 1.35293E−8 | −1.19432E−9 |

| # | $A_6$ | $A_7$ | $A_8$ | $A_9$ | $A_{10}$ |
|---|---|---|---|---|---|
| 17 | −6.96630E−11 | 2.47599E−13 | 2.01558E−14 | 3.20286E−16 | 3.86019E−18 |
| Mirror Surface M | 9.69148E−12 | 4.49304E−14 | −9.23846E−16 | 4.96501E−19 | 3.32847E−20 |

| # | $A_{11}$ | $A_{12}$ | $A_{13}$ | $A_{14}$ | $A_{15}$ |
|---|---|---|---|---|---|
| 17 | 6.41441E−20 | 6.38500E−22 | 6.11479E−24 | 8.91812E−26 | 8.22154E−28 |
| Mirror Surface M | 1.82219E−23 | −1.19492E−24 | 1.74427E−27 | −2.62115E−29 | 2.13601E−31 |

| # | $A_{16}$ | $A_{17}$ | $A_{18}$ | $A_{19}$ | $A_{20}$ |
|---|---|---|---|---|---|
| 17 | 7.55509E−30 | 1.09281E−31 | 9.57870E−34 | 8.70711E−36 | 1.48242E−37 |
| Mirror Surface M | 2.44984E−33 | −2.94144E−35 | 1.03085E−37 | −1.14907E−40 | −2.77142E−44 |

The projection optical system of Embodiment 2 satisfies Conditions (1)-(4) above, as set forth in Table 6 below.

TABLE 6

| Condition No. | Condition | Value |
|---|---|---|
| (1) | $0.55 < |\tan \theta 1| < 0.84$ | 0.673 |
| (2) | $0.75 < |\tan \theta 2| < 1.3$ | 1.024 |
| (3) | $1.7 < |(L \cdot \tan \theta 1)/Y| < 2.8$ | 2.264 |
| (4) | $v_{convex} > 80$ | 81.6 |

Figure 7A:
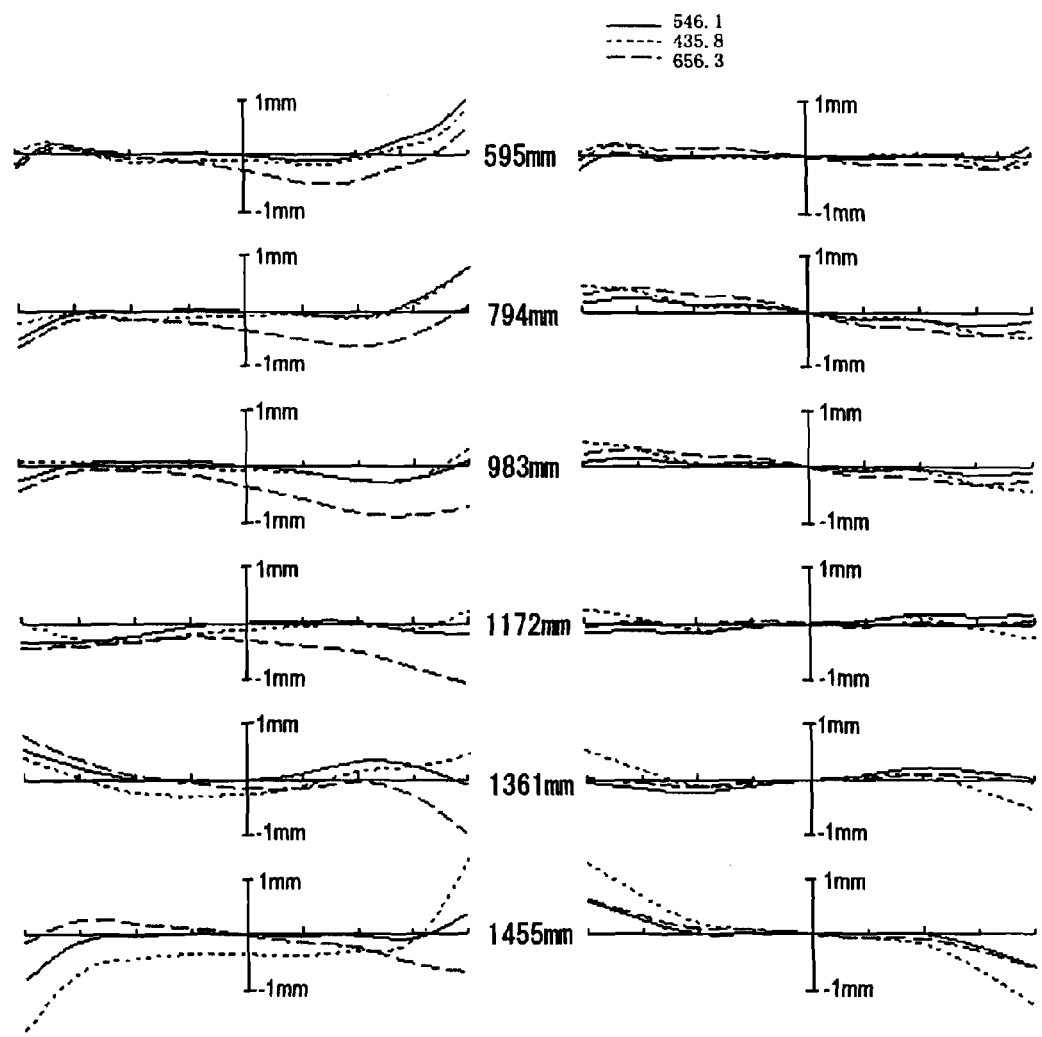
FIGS. 7A and 7B show the coma and distortion, respectively, of the projection optical system according to Embodiment 2 of the present invention.
Figure 7B:
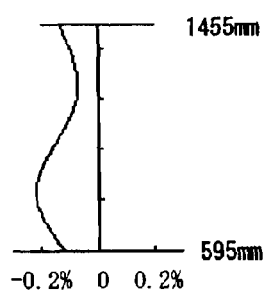

FIG. 7A shows the coma of the projection optical system of Embodiment 2 of the present invention at varying distances (595 mm to 1455 mm) from the optical axis X for light of wavelengths 435.8 nm, 546.1 nm, and 656.3 nm on the screen 5. FIG. 7A shows the coma for both the tangential (left column) and sagittal (right column) image surfaces. FIG. 7B shows the distortion (in percent) at varying distances (595 mm to 1455 mm) from the optical axis X on the screen 5.

As shown in FIGS. 7A-7B, the projection optical system of Embodiment 2 of the present invention is a high performance projection optical system that is able to favorably correct aberrations.

Figure 8:
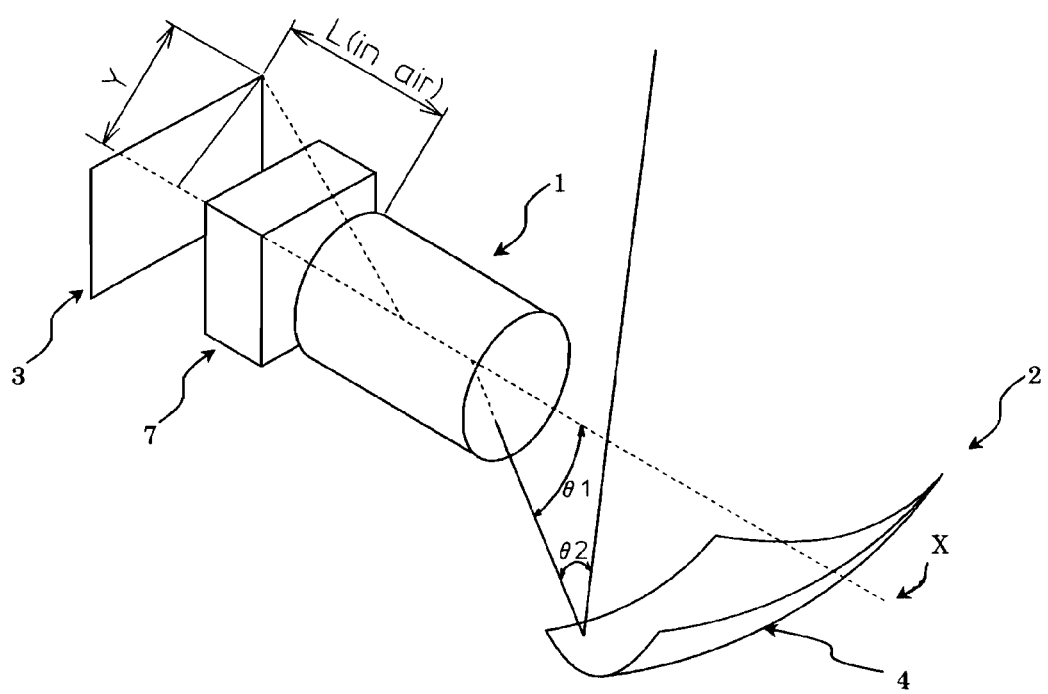
FIG. 8 illustrates the angles θ1, θ2 and the distances L and Y of the projection optical system.

FIG. 8 illustrates the angles θ1, θ2 and the distances L and Y of the projection optical system of both embodiments.

The projection display device of the present invention is characterized by including a projection optical system of the present invention.

The projection optical system of the present invention and the projection display device of the present invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Additionally, for example, the shape of the curved mirror surface and the position and arrangement of the curved mirror may be varied. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection optical system having a magnification side and a reduction side for forming a magnified image on a magnification side image surface that is conjugate with a reduction side image surface, said projection optical system comprising, arranged in order from the reduction side:
   a first imaging system including a plurality of lens elements and lens components arranged along an optical axis; and
   a second imaging system including a mirror having a concave, aspheric reflecting surface; wherein
   an intermediate image is formed between said first imaging system and said second imaging system;
   said reduction side image surface is located on one side of the optical axis of the first imaging system, thereby causing said reduction side image surface and said intermediate image to be located across the optical axis of the first imaging system; and
   the reflecting surface of said mirror is made to be a rotationally-symmetrical surface
   wherein the following condition is satisfied:

$0.55 < |\tan \theta 1| < 0.84$ where
   θ1 is the maximum angle among all the angles that principal rays from said first imaging system to said second imaging system make with the normal to said reduction side conjugate image surface.

2. The projection optical system of claim 1, wherein the following condition is satisfied:

$0.75 < |\tan \theta 2| < 1.3$ where
   θ2 is the angle difference between the incident angle and emergent angle in said second imaging system of the principal ray having the maximum angle among all the angles that principal rays from said first imaging system to said second imaging system make with the normal to said reduction side conjugate image surface.

3. The projection optical system of claim 1, wherein:
   all the optical elements of said first imaging system are rotationally symmetric about said optical axis.

4. The projection optical system of claim 1, wherein said first imaging system and said second imaging system have a common optical axis.

5. The projection optical system of claims 1, wherein:

Said first imaging system includes at least one lens element having positive refractive power; and The material of said at least on lens element satisfies the following condition:

$$\nu_{convex} > 80$$

where $\nu_{convex}$ is the Abbe number of said material.

6. The projection optical system of claim 1, wherein at least one reflecting optical element is present between said second imaging system and said magnification side image surface.

7. The projection optical system of claim 1, wherein no optical element is present between said first imaging system and said second imaging system.

8. The projection optical system of claim 1, wherein said first imaging system includes a lens element having negative refractive power and made of a resinous material.

9. A projection display device including the projection optical system of claim 1.

10. A projection display device including the projection optical system of claim 2.

11. A projection display device including the projection optical system of claim 3.

12. A projection display device including the projection optical system of claim 4.

13. A projection display device including the projection optical system of claim 5.

14. A projection display device including the projection optical system of claim 6.

* * * * *